US006784257B2

(12) United States Patent
Hilgers et al.

(10) Patent No.: US 6,784,257 B2
(45) Date of Patent: Aug. 31, 2004

(54) ANTISTATIC POLYMER COMPOSITIONS

(75) Inventors: Hermann Josef Hilgers, Le Tilleul Othon (FR); Christophe Lacroix, Bernay (FR); Reinhard Linemann, Bernay (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/556,977

(22) Filed: Apr. 24, 2000

(65) Prior Publication Data

US 2003/0139539 A1 Jul. 24, 2003

(30) Foreign Application Priority Data

Apr. 23, 1999 (FR) .......................................... 99 05430

(51) Int. Cl.[7] .............................................. C08G 69/48

(52) U.S. Cl. ...................... 525/420; 528/332; 528/335; 525/424; 525/425; 525/426; 525/427; 525/433

(58) Field of Search ................................ 528/333, 335; 525/420, 424, 425, 426, 427, 433

(56) References Cited

U.S. PATENT DOCUMENTS

| | | | | |
|---|---|---|---|---|
| 4,331,786 A | * | 5/1982 | Foy et al. | 525/468 |
| 4,899,521 A | * | 2/1990 | Havens | 53/461 |
| 5,346,959 A | * | 9/1994 | Goman et al. | 525/187 |
| 5,886,097 A | | 3/1999 | Fukumoto et al. | |

FOREIGN PATENT DOCUMENTS

| | | |
|---|---|---|
| EP | 0 242 158 A | 10/1987 |
| EP | 0 290 761 A | 11/1988 |

* cited by examiner

*Primary Examiner*—Samuel A. Acquah
(74) *Attorney, Agent, or Firm*—Millen, White, Zelano & Branigan, P.C.

(57) ABSTRACT

The present invention relates to an antistatic polymer composition and more specifically to a composition comprising a thermoplastic polymer (A) and a copolymer (B) comprising polyamide blocks and polyether blocks comprising essentially ethylene oxide units —($C_2H_4$—O)—, the copolymer (B) having a melting temperature of between 80 and 150° C. It is of use for the polymers (A) which are heat-sensitive or which are processed at low temperature.

26 Claims, No Drawings

ANTISTATIC POLYMER COMPOSITIONS

FIELD OF THE INVENTION

The present invention relates to an antistatic polymer composition and more specifically to a composition comprising a thermoplastic polymer (A) and a copolymer (B) comprising polyamide blocks and polyether blocks comprising essentially ethylene oxide units —$(C_2H_4$—O)—, the copolymer (B) having a melting temperature of between 80 and 150° C. and advantageously of between 90 and 135° C.

BACKGROUND OF THE INVENTION

The invention relates to giving antistatic properties to the thermoplastic polymer (A). The formation and the retention of static electricity charges at the surface of most plastics are known. The presence of static electricity on thermoplastic films results, for example, in these films sticking to one another, making it difficult to separate them. The presence of static electricity on packaging films can result in the accumulation of dust on the items to be packaged and can thus interfere with their use. Static electricity can also damage microprocessors or components of electronic circuits. Static electricity can also bring about the combustion or the explosion of inflammable materials, such as, for example, expandable polystyrene beads, which comprise pentane.

The prior art has disclosed antistatic agents, such as ionic surfactants of the ethoxylated amine or sulphonate type, which are added to polymers.

However, the antistatic properties of the resultant polymers not only depend on the ambient humidity but are also not permanent, since such antistatic agents migrate to the surface of the polymer and disappear. Copolymers comprising polyamide blocks and polyether blocks which are hydrophilic were then provided as antistatic agents. These agents have the advantage of not migrating and therefore of giving permanent antistatic properties which are, furthermore, independent of the ambient humidity.

SUMMARY OF THE INVENTION

The aim of the present invention is to introduce permanent antistatic properties into a heat-sensitive polymer (A). It has been found to be particularly advantageous to use a copolymer (B) having a low melting temperature. The prior art has not disclosed such systems. More specically, the prior art has disclosed systems which are undesirable for the purposes of the present invention, to wit:

Patent EP 525 365 discloses antistatic compositions comprising 100 parts of PVC and 5 to 15 parts of a copolymer (i) comprising polyamide blocks and polyethylene glycol (PEG) blocks. The copolymer (i) has a melting temperature of 155.6° C., if the polyamide blocks are made of polyamide-12 (PA 12), and of 195° C., if the polyamide blocks are made of PA-6.

Patent EP 829 520 discloses antistatic compositions comprising a thermoplastic, such as PVC, polypropylene, polyethylene or ABS, and a copolymer (i) comprising polyamide blocks and polyethylene glycol blocks which is deposited on fibres. The melting temperature of (i) is not specified but the description refers to Patent EP 613 819 for the definition of (i). In the latter patent, the polyamide blocks (i) are composed of PA-6, which implies melting temperatures of at least 195° C.

Patent Application JP 05 311 022 A, published on Nov. 22, 1993 (priority 92JP-143 633), discloses mixtures of PVC, of a copolymer of an unsaturated ester and of carbon monoxide, of polyethylene glycol and of an inorganic salt chosen from alkali metal perchlorates and from alkali metal thiocyanates. The polyethylene glycol does not have a melting point but it readily migrates and therefore the antistatic properties disappear.

Accordingly preceding prior art has disclosed either polymers having an excessively high melting temperature or polymers which migrate and has therefore not disclosed the systems of the present invention.

According to a second form of the invention, the polyamide blocks of the copolymer (B) are copolyamides resulting from the condensation of at least one α,ω-aminocarboxylic acid (or one lactam), at least one diamine and at least one dicarboxylic acid. An advantage of this form is that it is possible to choose comonomers of the copolyamides which improve the compatibilization of (A) and (B).

Another advantage of the compositions of the present invention relates to the polymers (A) which are not heat-sensitive but which are processed at low temperature. It is pointless to use high temperatures only to melt the copolymer (B). This is because the polyether blocks are sometimes sensitive to high temperatures and colorations of (B) are observed.

Another advantage of the compositions of the invention is their ease of preparation. This is because the compositions of the invention are generally prepared by mixing (A) and (B) in single-screw or twin-screw extruders, Busse® mixers, kneaders or any equivalent device used in thermoplastics technology. The low melting temperature facilitates the mixing of (A) and (B).

The invention will now be described in detail.

Mention may be made, as examples of polymers (A), of polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl (meth)acrylate, ABS, SAN, polyacetal and polyketones. The term "polyolefins" within the meaning of the invention also denotes the copolymers of ethylene and of an α-olefin. It would not be departing from the scope of the invention to use a mixture of two or more polymers (A). As regards the copolymer (B), its intrinsic viscosity in solution is advantageously between 0.8 and 1.75 dl/g. This relative viscosity is measured as a 0.5% solution in meta-cresol using an Ostwald viscometer.

The polymers comprising polyamide blocks and polyether blocks result from the copolycondensation of polyamide sequences comprising reactive ends with polyether sequences comprising reactive ends, such as, inter alia:

1) Polyamide sequences comprising diamine chain ends with polyoxyalkylene sequences comprising dicarboxyl chain ends.
2) Polyamide sequences comprising dicarboxyl chain ends with polyoxyalkylene sequences comprising diamine chain ends obtained by cyanoethylation and hydrogenation of aliphatic α,ω-dihydroxylated polyoxyalkylene sequences, known as polyetherdiols.
3) Polyamide sequences comprising dicarboxyl chain ends with polyetherdiols, the products obtained being, in this specific case, polyetheresteramides. These copolymers are particularly advantageous.

The polyamide sequences comprising dicarboxyl chain ends originate, for examples, from the condensation of α,ω-aminocarboxylic acids, of lactams or of dicarboxylic acids and diamines in the presence of a chain-limiting dicarboxylic acid.

According to a first form of the invention, the polyamide sequences result, for example, from the condensation of one or more α,ω-aminocarboxylic acids and/or of one or more lactams having from 6 to 12 carbon atoms in the presence of a dicarboxylic acid having from 4 to 12 carbon atoms and are low in mass, that is to say $\overline{M}n$ of 400 to 1000 and advantageously of 400 to 800. Mention may be made, as example of α,ω-aminocarboxylic acid, of aminoundecanoic acid and aminododecanoic acid. Mention may be made, as example of dicarboxylic acid, of adipic acid, sebacic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid $HOOC—(CH_2)_{10}—COOH$.

Mention may be made, as examples of lactams, of caprolactam and lauryllactam.

Caprolactam will be avoided, unless the polyamide is purified from the caprolactam monomer which remains dissolved therein.

Polyamide sequences obtained by condensation of lauryllactam in the presence of adipic acid or of dodecanedioic acid and with a mass $\overline{M}n$ of 750 have a melting temperature of 127 –130° C.

According to a second form of the invention, the polyamide sequences result from the condensation of at least one α,ω-aminocarboxylic acid (or one lactam), at least one diamine and at least one dicarboxylic acid. The α,ω-aminocarboxylic acid, the lactam and the dicarboxylic acid can be chosen from those mentioned above.

The diamine can be an aliphatic diamine having from 6 to 12 carbon atoms. It can be arylic and/or saturated cyclic.

Mention may be made, as examples, of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyoldiamines, isophoronediamine (IPD), methylpentamethylenediamine (MPDM), bis(aminocyclohexyl)methane (BACM) or bis(3-methyl-4-aminocyclohexyl)methane (BMACM).

The various constituents of the polyamide sequence and their proportions are chosen in order to obtain a melting temperature of less than 150° C. and advantageously of between 90 and 135° C.

The polyether blocks can represent 5 to 85% by weight of (B). The polyether blocks can comprise units other than ethylene oxide units, such as, for example, propylene oxide or tetrahydrofuran (which results in polytetramethylene glycol chains). It is also possible to simultaneously use PEG blocks, that is to say those composed of ethylene oxide units, PPG blocks, that is to say those composed of propylene oxide units, and PTMG blocks, that is to say those composed of tetramethylene glycol units, also known as polytetrahydrofuran blocks. Use is advantageously made of PEG blocks or blocks obtained by oxyethylation of bisphenols, such as, for example, bisphenol A. The latter products are disclosed in Patent EP 613 919. The amount of polyether blocks in (B) is advantageously from 10 to 55% and preferably from 20 to 45% by weight of (B).

Copolyamides with a low melting temperature are disclosed in Patents U.S. Pat. No. 4,483,975, DE 3 730 504 and U.S. Pat. No. 5,459,230. Use is made of the same proportions of the constituents for the polyamide blocks of (B). (B) can also be the copolymers disclosed in U.S. Pat. No. 5,489,667.

The copolymers of the invention can be prepared by any means which makes it possible to link together the polyamide blocks and the polyether blocks. In practice, use is made of essentially two processes, one known as a two-stage process and the other as a one-stage process.

The two-stage process consists firstly in preparing the polyamide blocks comprising carboxyl ends by condensation of the polyamide precursors in the presence of a chain-limiting dicarboxylic acid and then, in a second stage, in adding the polyether and a catalyst. If the polyamide precursors are only lactams or α,ω-aminocarboxylic acids, a dicarboxylic acid is added. If the precursors already comprise a dicarboxylic acid, it is used in excess with respect to the stoichiometry of the diamines. The reaction is usually carried out between 180 and 300° C., preferably 200 to 260° C. The pressure in the reactor settles down between 5 and 30 bar and is maintained for approximately 2 hours. The pressure is slowly reduced in opening the reactor to the atmosphere and then the excess water is distilled off, for example in one hour or two.

With the polyamide comprising carboxylic acid ends having been prepared, the polyether and a catalyst are subsequently added. The polyether can be added in one or more steps and likewise for the catalyst. According to one advantageous form, the polyether is firstly added and the reaction of the OH ends of the polyether and of the COOH ends of the polyamide begins with the formation of ester bonds and the removal of water; as much water as possible is removed from the reaction mixture by distillation and then the catalyst is introduced in order to bring the bonding of the polyamide blocks and of the polyether blocks to completion. This second stage is carried out with stirring, preferably under a vacuum of at least 5 mm Hg (650 Pa), at a temperature such that the reactants and the copolymers obtained are in the molten state. By way of example, this temperature can be between 100 and 400° C. and generally 200 and 300° C. The reaction is monitored by measuring the torsional couple exerted by the molten polymer on the stirrer or by measuring the electrical power consumed by the stirrer. The end of the reaction is determined by the value of the couple or of the power which is targeted. The catalyst is defined as being any product which makes it possible to facilitate the bonding of the polyamide blocks and of the polyether blocks by esterification. The catalyst is advantageously a derivative of a metal (M) chosen from the group formed by titanium, zirconium and hafnium.

Mention may be made, as example of derivative, of the tetraalkoxides which correspond to the general formula $M(OR)_4$, in which M represents titanium, zirconium or hafnium and the R groups, which are identical or different, denote linear or branched alkyl radicals having from 1 to 24 carbon atoms.

The $C_1$ to $C_{24}$ alkyl radicals from which are chosen the R radicals of the tetraalkoxides used as catalysts in the process according to the invention are, for example, those such as methyl, ethyl, propyl, isopropyl, butyl, ethylhexyl, decyl, dodecyl or hexadodecyl. The preferred catalysts are the tetraalkoxides in which the R radicals, which are identical or different, are $C_1$ to $C_8$ alkyl radicals.

Examples of such catalysts are in particular $Zr(OC_2H_5)_4$, $Zr(O\text{-iso}C_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$ or $Hf(O\text{-iso}C_3H_7)_4$.

The catalyst used in this process according to the invention can consist solely of one or more of the tetraalkoxides of formula $M(OR_4)$ defined above. It can also be formed by the combination of one or more of these tetraalkoxides with one or more alkali metal or alkaline earth metal alcoholates of formula $(R_1O)_pY$, in which $R_1$ denotes a hydrocarbon-comprising residue, advantageously a $C_1$ to $C_{24}$ and preferably $C_1$ to $C_8$ alkyl residue, Y represents an alkali metal or alkaline earth metal and p is the valency of Y. The amounts of alkali metal or alkaline earth metal alcoholate and of zirconium or hafnium tetraalkoxides which are combined in order to constitute the mixed catalyst can vary within wide limits. However, it is preferable to use amounts of alcoholate and of tetraalkoxides such that the molar proportion of alcoholate is substantially equal to the molar proportion of tetraalkoxide.

The proportion by weight of catalyst, that is to say of the tetraalkoxide or tetraalkoxides, when the catalyst does not include alkali metal or alkaline earth metal alcoholate, or else of the grouping of the tetraalkoxide or tetraalkoxides and of the alkali metal or alkaline earth metal alcoholate or alcoholates, when the catalyst is formed by the combination of these two types of compound, advantageously varies from 0.01 to 5% of the weight of the mixture of the dicarboxyl polyamide with the polyalkylene glycol and is preferably between 0.05 and 2% of this weight.

Mention may also be made, as examples of other derivatives, of the salts of the metal (M), in particular the salts of (M) and of an organic acid and the complex salts between the oxide of (M) and/or the hydroxide of (M) and an organic acid. The organic acid can advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts may be known as zirconyl salts. Without being bound by this explanation, it is believed that these salts of zirconium and of an organic acid or the complex salts mentioned above release ZrO++ during the process. Use is made of the product sold under the name of zirconyl acetate. The amount to be used is the same as for the $M(OR)_4$ derivatives.

This process and these catalysts are disclosed in Patents U.S. Pat. No. 4,332,920, U.S. Pat. No. 4,230,838, U.S. Pat. No. 4,331,786, U.S. Pat. No. 4,252,920, JP 07145368A, JP 06287547A and EP 613 919.

As regards the one-stage process, all the reactants used in the two-stage process are mixed, that is to say the polyamide precursors, the chain-limiting dicarboxylic acid, the polyether and the catalyst. It concerns the same reactants and the same catalyst as in the two-stage process described above. If the polyamide precursors are only lactams, it is advantageous to add a small amount of water.

The copolymer has essentially the same polyether blocks and the same polyamide blocks but also a small portion of the various reactants which have reacted randomly, which are distributed statistically along the polymer chain.

The reactor is closed and heated with stirring, as in the first stage of the two-stage process described above. The pressure settles down between 5 and 30 bar. When it no longer changes, the reactor is placed under reduced pressure while maintaining vigorous stirring of the molten reactants. The reaction is monitored as above for the two-stage process.

The catalyst used in the one-stage process is preferably a salt of the metal (M) and of an organic acid or a complex salt between the oxide of (M) and/or the hydroxide of (M) and an organic acid.

As regards the proportions of (A) and (B), the amount of (B) depends on the level of antistatic behaviour demanded and on the proportion of polyether in (B). The proportion of (A) and (B) varies from 2 to 40 parts of (B) per 98 to 60 parts of (A). Use is advantageously made of 2 to 20 parts of (B) per 98 to 80 parts of (A).

In addition, the compositions according to the invention can comprise at least one additive chosen from:

fillers (inorganic, fire-retardant, and the like), fibres, inorganic and/or organic and/or polyelectrolyte salts, dyes, pigments, optical brighteners, antioxidants, UV stabilizers.

EXAMPLE

Preparation of the 6-6/6-10/12/PEG.6 copolymer in 14/14/42/30 proportions. "PEG.6" means that the polyether is PEG and adipic acid is the chain limiting monomer. The proportion of the chain limiting monomer is 5 to 20 moles per 100 moles of the whole polyether and the chain limiting monomer.

The following monomers are introduced into an autoclave which is equipped with a stirrer: 16,800 g of lauryllactam, 3557 g of sebacic acid (C10), 5408 g of adipic acid and 6188 g of hexamethylenediamine (in the form of a 73.1% solution in water).

The mixture thus formed is placed under an inert atmosphere and heated until the temperature reaches 290° C. while maintaining vigorous stirring from the time the reactants have melted. The conditions are maintained at 290° C. and 25 bar of pressure for 2 hours (precondensation). Subsequently, the pressure is slowly (1.25 h) decreased from 25 bar to atmospheric pressure and the temperature from 290 to 245° C. There are now introduced a fine dispersion of 9711 g of dihydroxylated polyoxyethylene (Mn=600) and 70 g of a solution of zirconyl acetate in water/acetic acid (0.625% total charge of the zirconyl acetate; $pH_{solution}$ =3.0–3.5).

The mixture obtained is placed under a reduced pressure of 30 mbar. The reaction is continued for a duration of 3 hours. The product is extruded into a water bath and granulated. The product obtained has an intrinsic viscosity equal to 1.12 dl/g; melting temperature (optically determined): 120–130° C.

The resultant material is then mixed by conventional means with any of the group (A) thermoplastics.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/05.430, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An antistatic polymer composition comprising a thermoplastic polymer (A) and a copolymer (B) comprising polyamide blocks and polyether blocks comprising ethylene oxide units —($C_2H_4$—O)—, the copolymer (B) having a melting temperature of between 80 and 150° C.

2. A composition according to claim 1, in which the polymer (A) is chosen from the group consisting of polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

3. A composition according to claim 1, in which the polyamide blocks of the copolymer (B) are copolyamides resulting from the condensation of at least one α,ω-aminocarboxylic acid (or one lactam) at least one diamine and at least one dicarboxylic acid.

4. A composition according to claim 1, in which the polyether blocks represent 5 to 85% by weight of (B).

5. A composition according to claim 1, in which the melting temperature of (B) is between 90 and 135° C.

6. A composition according to claim 1, in which the polyether blocks represent 10 to 55% by weight of (B).

7. A composition according to claim 1, in which the polyether blocks represent 20 to 45% by weight of (B).

8. A composition according to claim 2, in which the polyamide blocks of the copolymer (B) are copolyamides resulting from the condensation of at least one α,ω-aminocarboxylic acid or one lactam, at least one diamine and at least one dicarboxylic acid.

9. A composition according to claim 8, in which the polyether blocks represent 20 to 45% by weight of (B).

10. A composition according to claim 8, in which the polyether blocks represent 10 to 55% by weight of (B).

11. A composition according to claim 8, in which the polyether blocks represent 20 to 45% by weight of (B).

12. A composition according to claim 4, in which the melting temperature of (B) is between 90 and 135° C.

13. A composition according to claim 6, in which the melting temperature of (B) is between 90 and 135° C.

14. A composition according to claim 7, in which the melting temperature of (B) is between 90 and 135° C.

15. An antistatic polymer composition according to claim 1, wherein the polyamide blocks of the copolymer (B) result from the condensation of at least one α,ω-aminocarboxylic acid or lactam having 6–12 carbon atoms, in the presence of a di-carboxylic acid having 4–12 carbon atoms, said polyamide blocks having a molecular mass, $\overline{M}n$ of 400–1000.

16. A composition according to claim 15, wherein the molecular $\overline{M}n$ is 400–800.

17. A composition according to claim 1, in which the polymer (A) is chosen from the group consisting of polyolefins, polyamides, fluorinated polymers, saturated polyesters, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

18. A composition according to claim 7, in which the polymer (A) is chosen from the group consisting of polyolefins, polyamides, fluorinated polymers, saturated polyesters, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

19. A composition according to claim 5, in which the polymer (A) is chosen from the group consisting of polyolefins, polyamides, fluorinated polymers, saturated polyesters, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

20. A composition according to claim 14, in which the polymer (A) is chosen from the group consisting of polyolefins, polyamides, fluorinated polymers, saturated polyesters, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

21. An antistatic polymer composition comprising as the sole polymers: a thermoplastic polymer (A) and a copolymer (B) comprising polyamide blocks and polyether blocks comprising ethylene oxide units —($C_2H_4$—O)—, the copolymer (B) having a melting temperature of between 80 and 150° C.

22. A composition according to claim 21, in which the polymer (A) is chosen from the group consisting of polyolefins, polyamides, fluorinated polymers, saturated polyesters, polycarbonate, styrene resins, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

23. An antistatic composition according to claim 20, wherein said melting temperature of (B) is between 90 and 135° C.

24. A method of providing an antistatic property for a heat-sensitive thermoplastic polymer (A) comprising admixing with said thermoplastic polymer a copolymer (B) comprising polyamide blocks and polyether blocks comprising ethylene oxide units —($C_2H_4$—O)—, the copolymer (B) having a melting temperature of between 80 and 150° C.

25. A method according to claim 24, wherein a heat-sensitive thermoplastic polymer (A) is chosen from the group consisting of polyolefins, polyamides, fluorinated polymers, saturated polyesters, PMMA, thermoplastic polyurethanes (TPU), PVC, copolymers of ethylene and of vinyl acetate (EVA), copolymers of ethylene and of an alkyl (meth)acrylate, ABS, SAN, polyacetal, polyketones, and a mixture of at least two of them.

26. A method according to claim 24, wherein the copolymer (B) has a melting point between 90 and 135° C.

* * * * *